D. L. TILTON.
Seed Planter.
No. 19,456.
Patented Feb. 23, 1858.
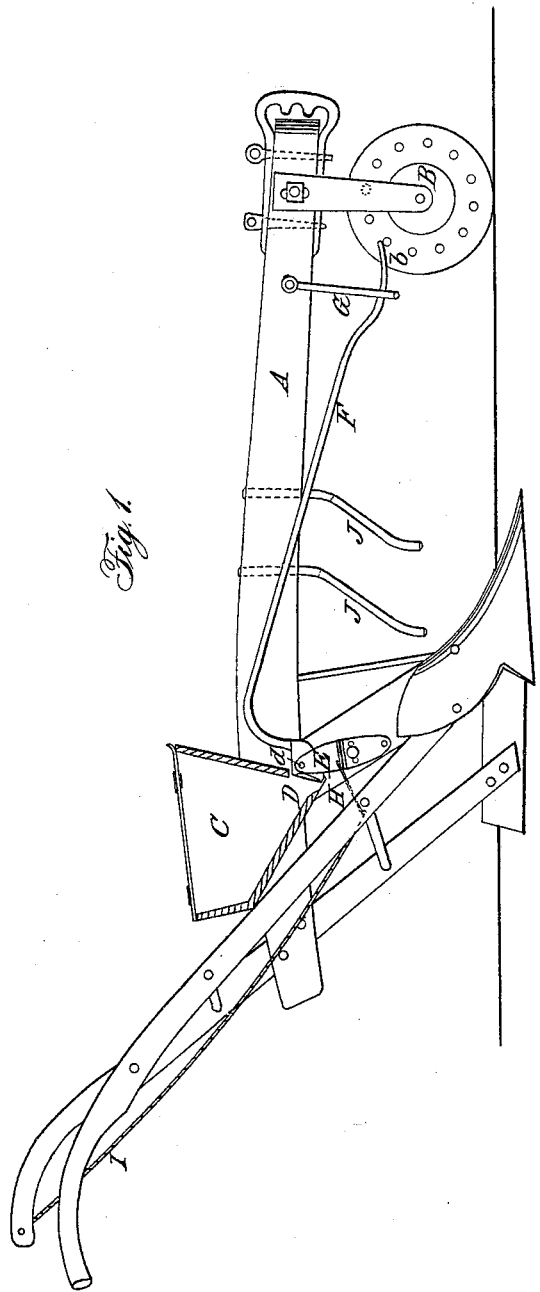
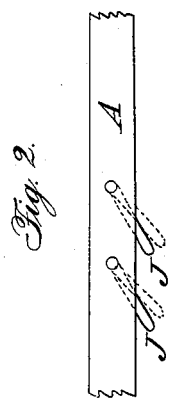

UNITED STATES PATENT OFFICE.

DANIEL L. TILTON, OF MOUNT CARMEL, ILLINOIS.

IMPROVEMENT IN SEED-PLANTERS.

Specification forming part of Letters Patent No. 19,456, dated February 23, 1858.

*To all whom it may concern:*

Be it known that I, DANIEL L. TILTON, of Mount Carmel, Wabash county, Illinois, have invented new and useful Improvements in Seeding-Plows; and I hereby declare the following to be a full and exact description of the same, reference being had to the accompanying drawings, making part of this specification.

My invention consists in a mode of adapting a common plow to sow in drills, and also to completely cover weeds, &c., in the act of plowing.

In the accompanying drawings, Figure 1 is a side elevation of the implement, the hopper being shown in section. Fig. 2 represents a portion of the machine viewed from above.

A represents the beam of a common plow, provided with an adjustable pitch-wheel, B.

C is a seed-hopper delivering seed into the freshly-opened furrow through a ventage, one side of which consists of a rocking block, D, whose fulcrum $d$ rests in a bracket, E, so hinged to the frame of the plow as to admit of a forward and backward adjustment to regulate the delivery of seed in accordance with the kind and quantity to be sown. The vibration of the block D is effected by a rod, F, extending forward to a circle of tabs, $b$, on the wheel B, and confined at its front end by a stirrup, G. This vibration may be varied by the substitution of a different tab-wheel or by changing the fulcrum $d$.

H is a swing-valve, which, being raised by means of a cord, I, closes the ventage at any time desired.

J J' are tines or prongs, (one or more in number,) bent in the manner shown, and so journaled in the beam A as to be capable of horizontal vibration. The object of this arrangement is to insure the complete covering of weeds and trash by the plow.

Practical use during the past season has fully demonstrated the effectiveness of this implement and its superiority to the common seed-drill in the following respects. The drill is applicable only to clear and even ground, requires practiced and skillful management, is liable to choke and become deranged, and its cost places it beyond the reach of many farmers. Moreover, drilling must of necessity be a distinct operation from that of plowing, whereas on the plan here exhibited, at an expense less than one-thirtieth the cost of a drill, a common plow can be adapted to sow simultaneously with plowing in any kind of ground, and can be worked by the ordinary and always available farm force at an outlay for labor at least fifty cents per acre under that of the drill. Beside which, the seed, being deposited in freshly-plowed ground, is placed in circumstances more favorable to germination.

The effect of the tines J on weeds, brush, &c., is very striking and complete. The resistance of the weeds forces the tines into a position obliquely backward and forward, as in Fig. 2, and by them the weeds, as the plow advances, are bent downward and forward and caused to roll over on each other like the strands of a rope, so that, falling closely into the furrow, they are completely covered by the furrow-slice.

In adjusting the capacity of the seeding-aperture care should be observed that it be not completely closed in any position of the block D, the intention being to discharge the seed in a continuous and uniform stream.

I claim as new and of my invention herein—

The arrangement of the vibrating block D, adjustable bracket E, with or without the valve H, in the described combination with the hopper C, for the purposes set forth.

In testimony of which invention I hereunto set my hand.

DANIEL L. TILTON.

Attest:
GEO. H. KNIGHT,
JOHN W. PIATT.